(12) United States Patent
Stout et al.

(10) Patent No.: US 6,893,540 B2
(45) Date of Patent: May 17, 2005

(54) HIGH TEMPERATURE PELTIER EFFECT WATER DISTILLER

(75) Inventors: Brian Stout, Panama City, FL (US); Robert Peebles, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 646 days.

(21) Appl. No.: 09/810,714

(22) Filed: Mar. 19, 2001

(65) Prior Publication Data

US 2002/0130029 A1 Sep. 19, 2002

(51) Int. Cl.[7] .......................... B01D 3/00; F25B 21/02
(52) U.S. Cl. .................. 203/10; 62/3.2; 62/3.3; 136/201; 136/203; 202/163; 203/100
(58) Field of Search .................. 203/10, 100, DIG. 17, 203/DIG. 4; 159/28.6; 202/176, 187, 234, 236, 163; 62/3.2, 3.3; 136/201, 203, 204

(56) References Cited

U.S. PATENT DOCUMENTS

| | | | | |
|---|---|---|---|---|
| 3,212,999 A | * | 10/1965 | Sommers, Jr. ............... 202/163 |
| 3,393,130 A | * | 7/1968 | Meckler ...................... 202/187 |
| 3,801,284 A | * | 4/1974 | Meckler ...................... 422/199 |
| 4,316,774 A | * | 2/1982 | Trusch ......................... 203/11 |
| 4,584,061 A | * | 4/1986 | Shelton ................... 202/185.6 |
| 5,300,197 A | * | 4/1994 | Mitani et al. ............... 202/177 |
| 6,375,805 B1 | * | 4/2002 | Dableh ......................... 203/10 |
| 6,463,743 B1 | * | 10/2002 | Laliberte ..................... 62/3.3 |
| 6,574,967 B1 | * | 6/2003 | Park et al. ................... 62/3.3 |

* cited by examiner

Primary Examiner—Virginia Manoharan
(74) Attorney, Agent, or Firm—James T. Shepherd

(57) ABSTRACT

An apparatus for and method of distillation uses a high temperature thermoelectric device to heat a liquid, such as water to vapor (steam) and cool the vapor to a purified, distilled liquid. Distillation system has no moving parts, thereby increasing reliability while reducing noise and maintenance. Liquid in a container has a heating section on the container extending into it to boil it into a vapor that is fed to a condenser section disposed on the container adjacent to the heating section. A thermoelectric section provided with a Peltier effect device is interposed between the heating section and condenser section. The Peltier effect device has one side in contiguous contact with the condenser to transfer heat from it and another side is in contiguous contact with the heating section to transfer heat to it to boil the liquid into the vapor and feed the vapor through the condenser that condenses it into distilled liquid.

14 Claims, 1 Drawing Sheet

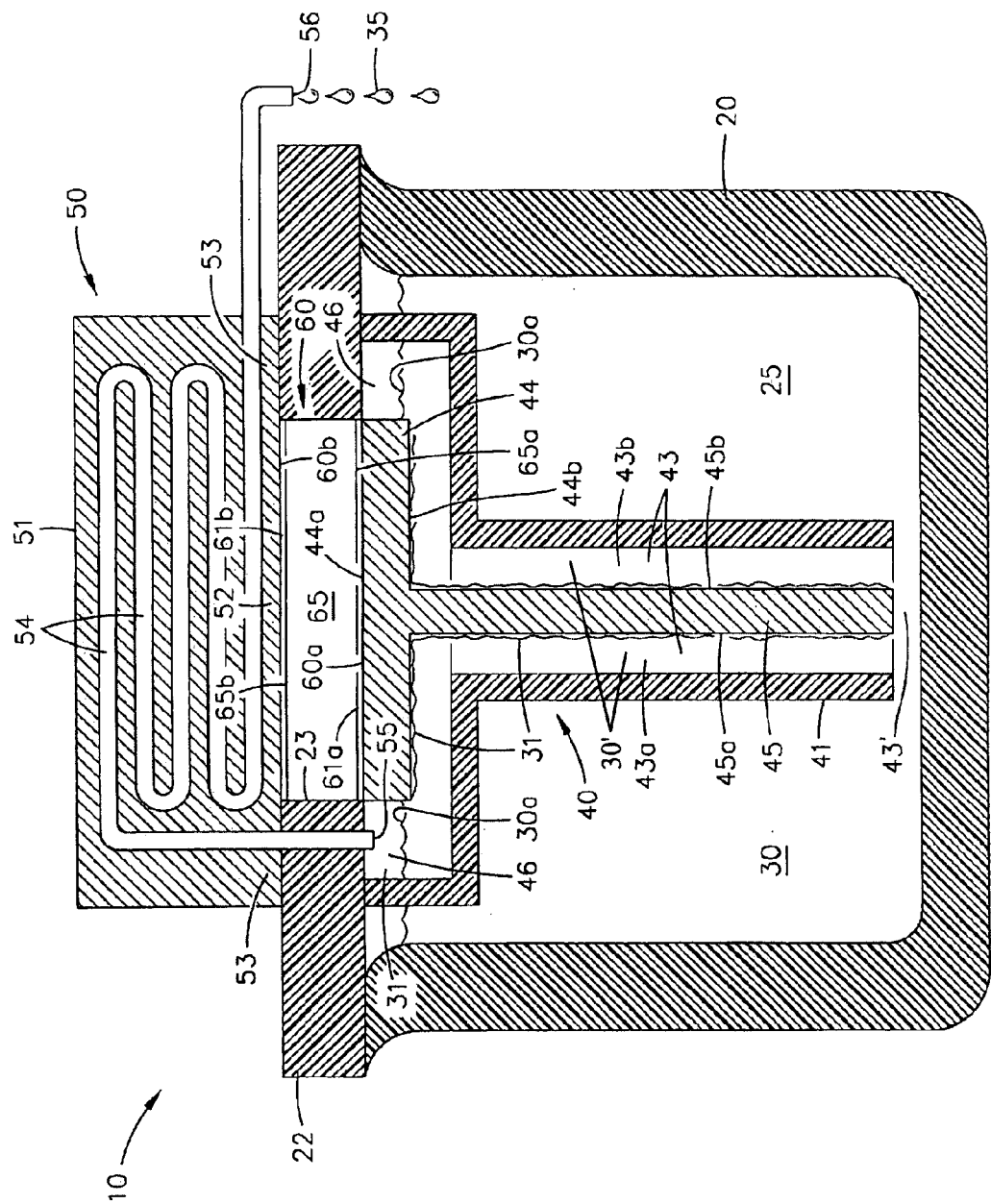

HIGH TEMPERATURE PELTIER EFFECT WATER DISTILLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus for and method of distilling water. More particularly, this invention utilizes a high temperature Peltier effect device to heat water to boil as a vapor and to cool it to distilled water.

Conventional distillers of water such as those designed to distill water in amounts suitable for use in the home have a separate condenser to transfer most or all of the heat along with some steam to the surrounding environment with a fan. This increases the workload on environmental handling systems to remove this heat energy and moisture from environmentally controlled living spaces. Conventional home distillers additionally transfer heat through the walls (including the bottom) of the water reservoir. As water is distilled in these contemporary distillers, precipitates created during the distillation process fall to the bottom of the reservoir. This layer of precipitates decreases the rate of heat transfer to the water and decreases the overall efficiency of these systems. In addition, this layer of precipitates becomes baked onto the bottom of the reservoir and requires expensive efforts and acidic cleansers to remove it.

Reservoirs of the conventional home distillers usually are constructed of relatively expensive stainless steel because of its high thermal conductivity and corrosion resistance. The high thermal conductivity of stainless steel is required because heat is transferred through the walls of the reservoir to the water. Another reason stainless steel is selected for construction of conventional home distillers is that precipitates baked onto the bottom of the reservoir are removed relatively easily. Irrespective of the benefits of stainless steel, it significantly increases the cost of home distillers.

Thus, in accordance with this inventive concept, a need has been recognized in the state of the art for a distillation system using a high temperature thermoelectric device that functions to heat water to its vapor point (steam) and cool the vapor to a distilled water.

SUMMARY OF THE INVENTION

The present invention provides a distillation system and method having a thermoelectric Peltier effect device interposed between and in contact with a heater section extending into a reservoir of water and a condenser section. The water is heated to its vapor point (steam) and cooled to condense to a distilled water by the same Peltier effect device that has no moving parts to provide for increased reliability and reduced noise and maintenance.

An object of the invention is to provide an apparatus for and method of distillation including a high temperature thermoelectric device having a Peltier effect device to first heat water to vapor and then cool the vapor to a distilled water.

Another object of the invention is to provide a distillation apparatus and method having no moving parts, to increase reliability and reduce noise and maintenance.

Another object of the invention is to provide a distillation apparatus and method providing for an increase in efficiency by taking the heat energy extracted during condensing and reusing it for heating.

Another object is to provide a distillation apparatus and method evaporating water by flash point vaporization to put heat energy directly in the volume of water instead of wasting it through the walls of a tank and concentrating the heat energy in a small volume of water to reduce the over all requirements for heat energy.

Another object of the invention is to provide a distillation apparatus and method heating only a small volume of water to the boiling point as opposed to conventional systems that heat entire volumes of water to the boiling point for the full duration of the distillation process.

Another object of the invention is to provide a distillation apparatus and method preventing the baking of precipitates onto the walls of the tank to increase reliability and reduce maintenance.

An object of the invention is to provide a highly reliable distillation apparatus and method having no moving parts and fabricated from porcelain, glass, plastics, etc., to reduce production costs as compared to stainless steel.

Another object of the invention is to provide a distillation apparatus and method operable by 110 V power sources as well as safer 12 V or 24 V DC power sources that can be conveniently packaged to be insulated from the effects of high heat and high moisture environments.

These and other objects of the invention will become more readily apparent from the ensuing specification when taken in conjunction with the appended claims.

BRIEF DESCRIPTION OF THE DRAWING

The FIGURE shows a cross-sectional view of a distillation system having a thermoelectric section including a Peltier effect device interposed between a heating section and condenser section in accordance with this invention.

DESCRIPTION OF THE PREFERRED EMBODIMENT

Referring to the FIGURE, a distillation system 10 has a container 20 containing a reservoir 25 of water 30, such as water for distillation into distilled water 35. Container 20 may be dish-shaped cylinder and made of a variety of materials, such as porcelain, glass, plastic etc., that are capable of holding water 30, and cover 22 made from a foam-like insulating material covers and extends across container 20 and reservoir 25 to block the transfer of heat. Container 20 may include suitable valves, feeder tubes, and a pump connected to a source (not shown) to replenish water 30 to keep it at or near a predetermined level 30a of water 30 in reservoir 25.

Distillation system 10 further includes a heating section 40, a condenser section 50, and a thermoelectric section 60. Thermoelectric section 60 is fitted into a traverse opening 23 in insulating cover 22 so that condenser section 50 and heating section 40 can operatively engage water 30 in container 20 to make distilled water 35. Heating section 40 is used to boil water 30 from a water state to a gaseous state, or vapor 31, and condenser section 50 is used to cool and condense the vaporized water 31 to distilled water 35. Thermoelectric section 60 has heat conductive plates 61a and 61b sized to extend across an opening 23 in insulating cover 22 and being in contact with heating section 40 and condenser section 50, respectively. Thermoelectric section 60 also has a Peltier effect device, hereinafter referred to as PE 65. PE 65 is disposed between plates 61a and 61b to effect the simultaneous heating and boiling of water 30 to vapor 31 and cooling and condensing of vapor 31 to distilled water 35.

Heating section 40 includes tubular-shaped wall 41 connected to and extending downwardly from insulating cover 22 to define a percolating chamber 43 having a T-shaped cross-sectional configuration having an open-ended bottom 43' to receive water 30. Tubular wall 41 is made from an insulating material to separate and insulate a portion 30' of water 30 in percolating chamber 43 from the rest of water 30 in container 20. As water portion 30' is vaporized, more of water 30 can flow into percolating chamber 43 via open-ended bottom 43' to replenish water portion 30'. Optionally, tubular wall 41 and percolating chamber 43 could be eliminated; however, such a modification will increase energy needed to vaporize the increased volume of water 30 and the time required to initiate the distillation process.

Heating section 40 additionally has a flat plate 44 of conductive material, such as metal, that has an inner surface 44a disposed in contiguous and intimate contact with thermoelectric section 60 via heat conductive plate 61a to absorb and transmit heat from a hot side 60a of thermoelectric section 60 to a rod 45. Rod 45 is connected to and orthogonally extends from flat plate 44 and can be made from the same conductive material as plate 44. Rod 45 extents into percolating chamber 43 to transmit heat to water portion 30' at and below level 30a. Parts of water portion 30' in portions 43a/43b of percolating chamber 43 are vaporized, or boiled into vapor 31 by heat conducted through plate 44 along an outer surface 44b and through rod 45 along rounder outer surface 45a/45b. The parts of water portion 30' that are vaporized into vapor 31 are replaced in percolating chamber 43 from water 30.

Vapor 31 bubbles upward through water portion 30' and collects in plenum 46. Plenum 46 includes the regions on both sides of first flat plate 44 and around rod 45 at the top of portions 43a/43b in percolating chamber 43.

Condenser section 50 may be fabricated from a block 51 of heat conductive metal material that has portion 52 lying adjacent to and in contiguous contact with a cold side 60b of thermoelectric section 60. Other portions 53 of condenser section 50 can extend to lie adjacent insulating cover 22 and be insulated from the heat associated with heated water 30 by heating section 40. Heat conductive metal block 51 of condenser section 50 can be cast or otherwise suitably machined with at least one serpentinely extending traverse passageway 54 from an inlet port 55 communicating with plenum 46 to an outlet port 56 where distilled water 35 may be collected.

Heat conducting plates 61a and 61b of thermoelectric section 60 are made from a conductive metal that serves to contain and protect PE 65 from the ambient. Heat conductive plate 61a also conducts heat and distributes it from PE 65 to surface 44a of flat plate 44 of heater section 40 and plate 61b conducts heat from adjacent portion 52 of condenser section 50 to PE 65. Electrical conductors and control components (not shown) may extend from PE 65 to supply DC power for the duration of the distillation process. PE 65 of thermoelectric section 60 is disposed within plates 61a and 61b in such a fashion to be in intimate contact with both heater section 40 and condenser section 50. PE 65 operates according to the Peltier effect.

The Peltier effect was first discovered in the 19th century and is the liberation of heat at one junction and the absorption of heat at the other junction when a current is passed through a circuit consisting two different metals. However, the temperature difference obtained with different metals is not high. More recently, semiconductors can be used to produce larger temperature differences across metal-semiconductor junctions of metal and n and p-type semiconductors to produce cold sides (heat absorption) and hot sides (heat liberation) so that a number of such metal-semiconductor junctions contained in PE 65 can be used as an effective source for heating water 30, such as water to vapor 31 and cooling vapor 31 to distilled water (water) 35.

A number of commercially available modules for liberating heat to heating section 40 and for absorbing heat from condenser section 50 as per the Peltier effect may be selected by one skilled in the art to which this invention pertains to fabricate PE 65 in thermoelectric section 60. These include and are not limited to the thermoelectric modules marketed under the trademark ZMAX by Tellurex Corporation 1248 Hastings Street, Traverse City, Mich. 49686; the thermoelectric modules model numbers TED-0606-018 . . . , TED 3030-127 . . . , TED 4040-127 . . . , etc., marketed by TE Distributing INC., 113 Hiltwood Drive, Hendersonville, Tenn. 37075; and the thermoelectric modules marketed by Ferrotec America Corporation, 40 Simon Street, Nashua, N.H. 03060. These modules are capable of heating heating section 40 to about 150 to 200° C. along one surface, or side and provide for a sufficiently lower temperature along another surface, or side to absorb heat from condenser section 50.

Sufficient numbers of these commercially available thermoelectric modules may be selected and are interconnected and arranged in accordance with manufactures specifications in PE 65 to create hot side 65a inside and adjacent to hot side 60a of thermoelectric section with heat conductive plates 61a in contiguous contact with surface 44a. The heat of hot side 65a is conducted to plate 44 and rod 45 via plate 61a to boil at least part of water portion 30' into steam-like vapor 31 along surface 45a/45b of rod 45. If, as shown in the FIGURE, level 30a of water 30 in reservoir 25 is raised to place outer surface 44b of plate 44 in water portion 30', then vapor 31 also will form on surface 44a. Heat is absorbed on cool, or cold side 65b of PE 65 in contact with heat conductive plate 61b to cool condenser section 50 via adjacent portion 52 and condense vapor 31 in serpentine passageway 54 into condensed and distilled water 35 that drains from outlet port 56. This heating and cooling of PE 65 of thermoelectric device 60 occur at the same time during the distillation process and since there are no moving parts, long-term reliability is assured.

In operation, reservoir 25 is filled with liquid, such as water. DC power is coupled to power-up PE 65 of thermoelectric section 60. Heat energy is transferred from condenser section 50 via adjacent portion 52 to percolating chamber 43 via the high temperature PE 65, which is in thermal contact with condenser section 50 and flat plate 44 and rod 45. This heat transfer is accomplished by 1.) absorbing heat in PE 65 on cool, or cold side 65b that is in contiguous contact with portion 52 of condenser section 50, 2.) conducting the absorbed heat through PE 65 and plate 44 and rod 45 and reusing it to partially heat water portion 30', and 3.) generating heat in PE 65 at hot side 65a and conducting it to plate 44 and rod 45 to boil water portion 30' into steam-like vapor 31 along surface 45a/45b of rod 45 and surface 44a of plate 44. Vapor 31 rises and collects in plenum 46 to pass through serpentine passageway 54 due to convection and increased pressure in plenum 46 that is caused by boiling parts of water portion 30' into vapor 31 in percolating chamber 43. The heat removed from condenser section 50 cools it via adjacent portion 52 and vapor 31 is condensed in serpentine passageway 54 into condensed and distilled water 35 that feeds by gravity through outlet port 56.

Distillation system 10 of this invention uses high temperature thermoelectric PE 65 to first heat parts of water portion 30' to a vapor 31 (steam) and then cool vapor 31 to purified distilled water 35. Distillation system 10 of this invention has no moving parts, thereby increasing reliability and reducing noise and maintenance. Distillation system 10 has increased efficiency by taking the heat energy extracted during condensing and reusing it for vaporization that vaporizes parts of water portion 30' by flash point vaporization. Concentrating heat energy directly in the volume of water portion 30' in percolating chamber 43 instead of heating the entire volume of water 30 to its boiling point for the full duration of the distillation process eliminates needless waste of heat that would be lost by transmitting it through the walls of container 20. In addition, by not boiling water 30 in container 20 baking precipitates onto the inner walls of container 20 is eliminated to reduce maintenance tasks, and relatively expensive stainless steel is not required so that less expensive and more readily available materials such as porcelain, glass, or plastics may be used. Distillation system 10 of this invention is uncomplicated and utilizes commercially available modules in PE 65 to assure high reliability, and can be powered by 12 V or 24 V DC power sources to be safer, have reduced power requirements, and could have power conversion and controls mounted in plug modules isolated from the high heat and high moisture environment where distillation occurs.

Having the teachings of this invention in mind, modifications and alternate embodiments of this invention may be adapted. Distillation system 10 can be in different sizes and configurations and fabricated from a number of different materials chosen to assure long term reliable operation under different operational requirements. Its uncomplicated, compact design, lack of possibly objectionable by-products, and use of commercially available constituents allows its use in confined spaces under adverse conditions.

The disclosed components and their arrangements as disclosed herein all contribute to the novel features of this invention. Distillation system 10 provides a quick and cost-effective way to distill liquid, including water, without introducing unnecessary complications or creating burdensome weight and size constraints. Therefore, distillation system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A distillation apparatus comprising:
   a container holding water;
   a heating section on said container and extending into said water to boil said water into a vapor;
   a condenser section on said container and adjacent to said heating section to condense said vapor into distilled water;
   a thermoelectric section having a Peltier effect device interposed between said heating section and said condenser section, said Peltier effect device having one side adjacent and in contact with said condenser section to transfer heat therefrom and an other side adjacent to and in contact with said heating section to transfer heat thereto to boil said water into said vapor and feed said vapor through said condenser to condense it into said distilled liquid; and
   an insulating cover extending across said container and having a traverse opening, said Peltier effect device of said thermoelectric section fitting in said traverse opening to place said one side in contiguous contact with said heating section and said other side in contiguous contact with said condenser section.

2. A distillation apparatus according to claim 2 wherein said heating section has a tubular-shaped insulating wall extending downward into said water to form an open-ended T-shaped percolating chamber to contain a portion of said water therein.

3. A distillation apparatus according to claim 2 wherein said heating section has a heat conductive plate and a rod connected together to extend into said percolating chamber and said water portion.

4. A distillation apparatus according to claim 3 wherein said plate has an inner surface disposed adjacent to and in contact with said Peltier effect device and an outer surface in contact with said water portion in said percolating chamber.

5. A distillation apparatus according to claim 4 wherein said rod orthogonally extends from said plate into said percolating chamber, said vapor forms on the outer surface of said rod and said outer surface of said plate, and said heating section has a plenum collecting said vapor.

6. A distillation apparatus according to claim 5 wherein said condenser section has a passageway serpentinely extending through a block of heat conducting material to receive said vapor at an inlet port and to feed said distilled water therefrom at an outlet port.

7. A distillation apparatus according to claim 6 wherein heat is transferred to said water by absorbing heat in said one side of said Peltier effect device, conducting said absorbed heat through said Peltier effect device and said plate and said rod, reusing said absorbed heat to partially heat said water portion, and generating heat in said Peltier effect device at said other side and conducting said generated heat to said plate and rod to boil parts of said water portion into said vapor along outer surface of said plate and said rod.

8. A method of distilling water comprising the steps of:
   extending a heating section into liquid in a container;
   heating said liquid to boil said liquid into a vapor;
   condensing said vapor into a distilled liquid in a condenser section on said container and adjacent to said heating section;
   transferring heat with a Peltier effect device interposed between said heating section and said condenser section, said Peltier effect device having one side adjacent and in contact with said condenser section to transfer heat therefrom and an other side adjacent to and in contact with said heating section to transfer heat thereto to boil said liquid into said vapor and feed said vapor through said condenser to condense it into said distilled liquid;
   extending an insulating cover across said container;
   mounting said Peltier effect device in a traverse opening in said insulating cover; and
   placing said one side of said Peltier effect device in contiguous contact with said heating section and said other side of said Peltier effect device in contiguous contact with said condenser section.

9. A method according to claim 8 further comprising the steps of:

extending a tubular-shaped insulating wall downwardly into said liquid to form an open-ended T-shaped percolating chamber; and containing a portion of said liquid in said T-shaped percolating chamber.

10. A method according to claim 9 further comprising the step of:

connecting a heat conductive plate and rod of said heating section to extend into said percolating chamber and said liquid portion therein.

11. A method according to claim 10 further comprising the steps of:

placing an inner surface of said plate adjacent to and in contact with said Peltier effect device; and contacting an outer surface of said plate with said liquid portion in said percolating chamber.

12. A method according to claim 11 further comprising the steps of:

extending said rod orthogonally from said plate into said percolating chamber;

forming said vapor on a surface of said rod and said outer surface of said first plate; and collecting said vapor in a plenum of said heating section.

13. A method according to claim 12 further comprising the steps of:

extending a passageway serpentinely through a block of heat conducting material of said condenser section;

receiving said vapor at an inlet port of said serpentinely extending passageway; and feeding said distilled liquid from an outlet port of said serpentinely extending passageway.

14. A method according to claim 13 wherein said step of transferring heat to said liquid includes the steps of:

absorbing heat in said one side of said Peltier effect device;

conducting said absorbed heat through said Peltier effect device and said first plate and rod;

reusing said absorbed heat to partially heat said liquid portion;

generating heat in said Peltier effect device at said other side;

conducting said generated heat to said plate and rod; and boiling parts of said liquid portion into said vapor along outer surfaces of said plate and said rod.

* * * * *